United States Patent [19]

Hodge et al.

[11] Patent Number: 4,559,705

[45] Date of Patent: Dec. 24, 1985

[54] INDEXING OVERLAY FOR VIDEO DISPLAY DEVICES

[76] Inventors: Michaela W. Hodge; Robert J. Hodge, both of 5757 Ravenspur Dr., #8, Rancho Palos Verdes, Calif. 90274

[21] Appl. No.: 554,884

[22] Filed: Nov. 25, 1983

[51] Int. Cl.[4] ............................................. G01B 3/00
[52] U.S. Cl. ...................................... 33/1 B; 340/734
[58] Field of Search ........................ 33/1 B, 1 C, 1 R; 340/734

[56] References Cited

U.S. PATENT DOCUMENTS 2,375,427  5/1945  Mannino ............................. 33/1 B
3,809,395  5/1974  Allison, Jr. et al. ............ 340/734 X Primary Examiner—William D. Martin, Jr.
Attorney, Agent, or Firm—Don B. Finkelstein

[57] ABSTRACT

Indexing overlay for computer display devices such as CRT's and plasma displays. The overlay consists of a sheet of hi-static vinyl, acetate or the like of a size to conveniently cover the display area of columns and rows of discrete displayable positions. The sheet is of a thickness so that the overlay can be electrostatically attachable to the face of the display device. A set of first indicia defined discrete columnar positions along a row. Another set of indicia break up the first indicia into discrete fields five indicia wide. One set of labeling indicia accumulatively number the columns from left to right and a second set of numbering indicia may be used to accumulatively number the rows from top to bottom. The indicia are imprinted in reverse on the back side of the sheet in black or bright color ink. The color is selected to give high contrast to the indicia against the type of display background upon which the overlay is used. The indicia may be printed as solid symbols or as a uniform tint to allow easier discrimination of the background. A preselected display format may be written by the user on the overlay in grease pencil or erasable felt tip pen, the overlay electrostatically applied to the CRT face, the cursor moved to a position indicated by the overlay, the user-selected symbols entered to create the display, the grease pencil markings erased and the overlay reused.

10 Claims, 3 Drawing Figures

INDEXING OVERLAY FOR VIDEO DISPLAY DEVICES

FIELD OF THE INVENTION

This invention involves an instrument that is used as an overlay to a computer display VIDEO INPUT DEVICE (VID) such as a cathode ray tube (CRT), liquid crystal or, plasma device. It is especially adapted to allow the user to create new display formats or edit existing display formats for data to be displayed upon a VID.

DESCRIPTION OF THE PRIOR ART

The VID is one of the most popular interface devices between a computer and a user. The VID is usually coupled with a keyboard which allows the user to enter symbols to be displayed upon the VID. The user is provided a visual feedback marker on the VID called a cursor. The cursor indicates to the user where the next character entered by the user will be displayed upon the VID. The user is usually provided with function keys that can control the positioning of the cursor in the VID display dimensions of up, down, right or left.

Some VIDs only display alpha-numeric characters. The normal construction of the display matrix for the alpha-numeric characters is to lay out the VID area in discrete columns from left to right and in discrete rows from top to bottom. The number of columns and rows varies with the particular VID.

Some VIDs are not equipped with a tab function to allow the user to move the cursor to a selected discrete columnar position along the row. When the user must enter data separated by more than two or three rows, the user may find it difficult to definitively position the cursor in the correct position without moving the cursor up to a position where the user can ascertain if the cursor is in the correct column and then moving the cursor back down to the cursor position in row and column numbers. However, even when the user is provided with curser position information it is still difficult for the user to determine the differential in row and column numbers between any two selected points on the VID as some VIDs start in position 6 or 7. For those VIDs equiped with a tab function, the user must usually count the number of spaces before entering a tab stop.

Users have employed many different types of instruments to lay out display formats. One class of instruments can be described as graph paper. The graph paper, with horizontal and vertical cross-hatch lines can be used to nominate the column and row position to be occupied by a selected symbol on the VID. However, once the display is laid out on the graph paper, there is no easy translation between the graph paper and the VID display. The user must still control the cursor to move the number of columns and number of rows indicated on the graph paper to position the cursor before entering the desired symbol. This type of entry has been relatively easy for display formats consisting merely of column headings in the top row of the VID or of row headings along either margin of the VID display, or a combination of both. When the display format requires that the symbol or groups of symbols be centered, the user must resort to counting columns and rows or center the cursor, count the number of symbols and backspace by one-half the number of symbols. All of this is tedious, time consuming, and prone to error.

There has long been a need to provide an aid to index the cursor positions for alphanumeric devices in the same dimensional space as occupied by the VID. With such an indexing system the tedium and eye strain in creating a display format can be greatly relieved, allowing the user to be more efficient and possibly more creative in the display design rather than spending her or his energies simply translating, checking, and double checking his column and row spacing.

There is another type of VID that, in addition to displaying alphanumeric characters, can also display graphic information. This graphic information can include maps, charts, or complete graphics that constitute works of art. An indexing arrangement can be utilized by a user for such graphics (VID)to aid in the spacing and balance of the particular creation. The graphics display is usually addressable by a number of selected points or pixels on the graphic VID. The pixels are so close together that the user cannot discriminate between positioning of adjacent pixels. Therefore, an indexing arrangement that works well for the alphanumeric VID that has discrete columns and rows could not be duplicated in an overlay arrangement to show the user the cursor location of a graphic display by individual pixels. However, the alphanumeric display indexing arrangement can be used upon a graphic VID to divide the graphic VID into user discernable space which greatly aids the user in controlling the location of the graphics cursor for entry of the desired symbol. Of course, when the graphics display is used in an alphanumeric mode, the indexing arrangement is utilized in the same manner as described above for indexing the placement of graphic symbols at user determined positions.

There has long been a need to provide an aid to the direct development of a program on the face of the VID or on a planer sheet that can be applied directly to the face of the VID for guiding the user on input of the program information.

SUMMARY OF THE INVENTION

Accordingly, it is the primary object of this invention to provide an indexing system for VID display formats, alphanumeric or graphics, to allow easy, visual interpretation of the cursor location. It is another object of this invention to provide an indexing instrument that can be used by the display designer, first at a desk to lay out the design, and second, to overly a design upon the VID for ease of entry of the display format. It is yet another object of this invention to provide an indexing arrangement that is easily visable by the user against the background of symbols displayed upon a VID so that the user may utilize the row and graphic indexing of the overlay as an aid in positioning the cursor.

It is yet another object to aid in the laying out of program design and information on the face of the VID or on a planer sheet that is subsequently applied to the face of the VID. The user then can position the cursor and enter the information dictated by the overlay.

To accomplish these and other objects, the overlay uses a selected indicia such as a dash to indicate the position of each column in each row. To facilitate the indexing of each column, the first and then every fifth dash is combined with a second indicia such as a vertical line. Using this type of indicia, the visual isolation of each character position for each column and each row of the display is easily ascertainable by the user. To aid in defining the precise present or proposed location of the cursor, a labeling indicia may be added above the top row and below the bottom row that labels each second indicia with accumulative numbering from left to right. As a further aid in determining the cursor position, a second labeling indicia may be used to number the rows. This second labeling indicia may be placed along either the right hand or left hand margin or both. The indicia may consecutively number each row or may accumulatively number the rows being placed at every fifth row. All of the above described indicia are printed on a flexible, transparent sheet of material such as hi-static vinyl, acetate or the like. The thickness of the sheet is such that the sheet may be written upon by an instrument such as a grease pencil for the initial layout of the display format on the sheet at a desk. The thickness of the sheet material is also chosen so that the sheet may be electrostatically applied to the face of the VID. If the sheet is too thick, the charge on the sheet may be insufficient to hold up the weight of the sheet. If the sheet is too thin, the sheet may deform when written upon or become electrostatically attached to itself and become difficult, if not impossible to easily apply to the face of the VID.

The indicia are imprinted upon the sheet, usually on the reverse side of the sheet in reverse printing, so that the working surface of the sheet is opposite the imprinted indicia to protect the imprinted indicia during use. The indicia may be printed in black or in color. The color should be selected so that the indicia are easily discernible against the usual green phosphorescent background of most VIDS. A bright yellow or orange color provides good contrast between the indicia and the background color of the VID.

The user can set a sheet of the indexing overlay on a desk with an appropriate background underneath the overlay. The background may be white or of a color chosen to facilitate the discrimination of the index indicia by the user. A sample format may be placed underneath the indexing overlay so that all or part of the underlying format may be transferred by user notation onto the indexing overlay. Several formats may be placed under the indexing overlay, one at a time, until a compilation of the individual formats is achieved by appropriate markings on the indexing overlay by the user. The user may use some instrument such as a grease pencil or erasable felt tip pen for marking upon the indexing overlay. The grease pencil is particularly adapted for this purpose because it is easily erasable so that the overlay may be reused. The user then applies the indexing overlay to the VID. The user directs the cursor to a position indicated by the indexing overlay and then enters the desired symbols into the format fields to build the desired format as a computer file for a user-selected application program or data base entry.

The overlay can also be used with no background of a previously designed format or program. The user can develope the program directly on the overlay, apply the overlay onto the face of the VID and enter the program information into the computer.

BRIEF DESCRIPTION OF THE DRAWING

The above and other embodiments of the present invention may be more fully understood from the following detailed description, taken together with the accompanying drawing wherein similar reference characters refer to similar elements throughout and in which.

DESCRIPTION OF THE PREFERRED EMBODIMENT

Figure 1:
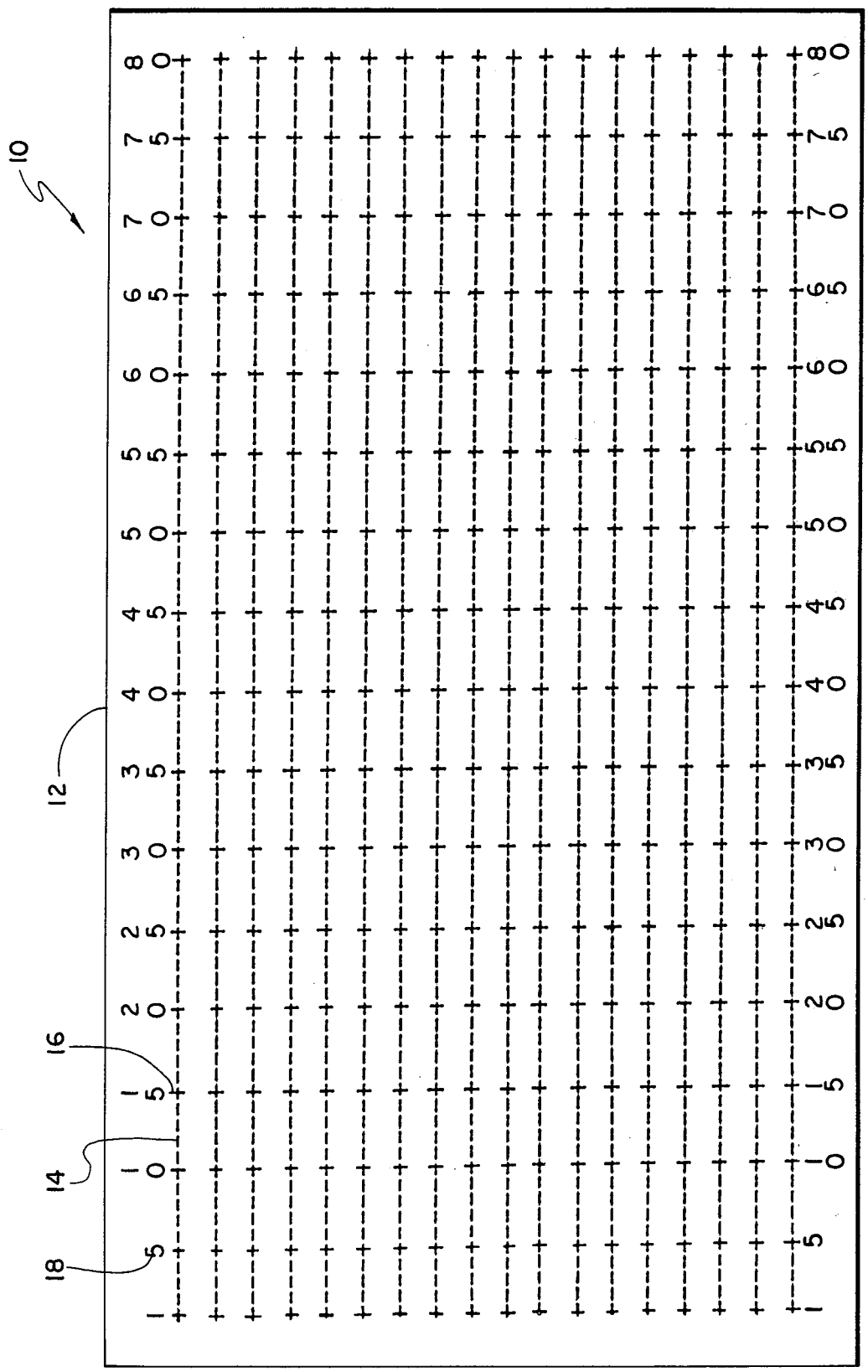
FIG. 1 represents one embodiment of the instrument.

Referring now to the drawing, there is illustrated in FIG. 1 a view of the VID indexing overlay generally designated 10. The body of the overlay 10 is a sheet 12 of flexible, transparent material. The material used for the sheet 12 may be hi-static vinyl, acetate or the like.

The VID upon which the overlay is to be used may utilize one of many formats. Some VIDs can generate only alpha-numeric characters. Other VIDs can generate graphic symbols as well as alphanumeric.

For those VIDs that generate alphanumeric characters only, the display area is divided into columns and rows. The prevalent number columns utilized by popular VIDs are 40, 64, 80, and 132 column wide display formats. The number of rows displayed by the VID usually are 16 or 24.

For those VIDs that generate both alphanumeric and graphic characters, the display area is addressable by each point in the display. An overlay indicating each point would not be practical as it would obliviate the screen. However, when these types of displays are used in the alphanumeric mode, the indexing overlay 10 can be applied to the front of the VID and used in the same manner for those VIDs that generate alphanumeric characters only. In addition, when graphic characters are being generated, the indexing overlay 10 can be utilized as a guide to the user in laying out such graphic displays as maps, graphs, drawings and the like.

The sheet 12 is wide enough to encompass the number of columns displayed by a particular VID. The height of the sheet 12 can be selected to encompass the entire VID display or some lesser number. For some VIDs the display system restricts entry of symbols by the user onto certain rows of the VID. Normally, the top line, the bottom line, or both lines of the VID have this restriction. These restricted rows are utilized by the computer operating system and application software to communicate the current status, error condition, system offset or relative cursor position, or other feedback information to the user. Thus, it is not required that the overlay encompass the restricted lines. To make the overlay universally applicable to a wide range of VIDs, the sheet may be high enough to encompass 18 rows of information spaced at the normal six rows per inch VID format. Other variations in width and height for a particular VID and applications program may be utilized.

The thickness of the sheet 12 is chosen with the following considerations. The sheet 12 must be flexible so that it conforms to the curved surface of the front of the conventional CRT with the phosphorescent screens. This is not a concern for the flat screen plasma displays. The sheet 12 must be of a thickness that will readily attach to the front of the VID electrostatically, but cannot be of a thickness whereby the weight of the sheet 12 overcomes the electrostatic attracting force. The sheet 12 cannot be so thin as to be difficult to remove from a work area and place upon the face of the VID. If the sheet 12 is too thin, it will be subject to tearing or becoming electrostatically attracted to itself with such force as to make it difficult to maintain the sheet 12 in a planar attitude for application to the VID.

The thickness of the sheet should also consider that the user may desire to write upon the sheet with an erasable instrument such as a grease pencil to lay out a desired format. The VID indexing overlay 10 can then be applied to the VID, the display entered, and the marks erased so that the indexing overlay 10 can be reused.

Figure 2:
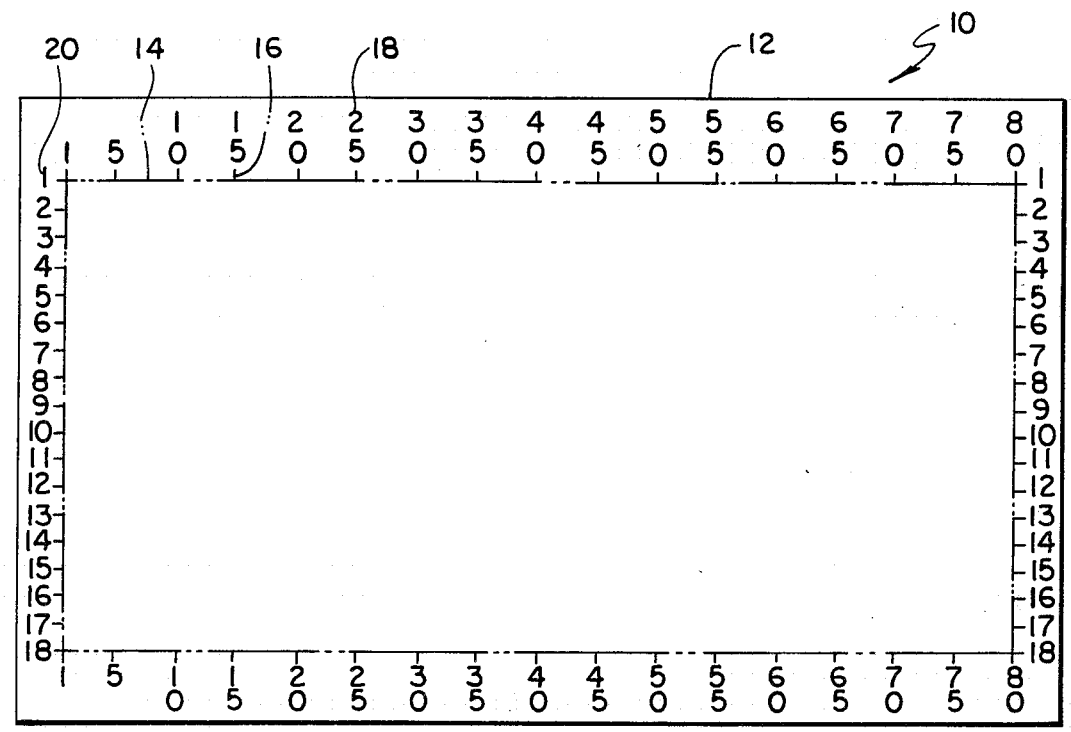
FIG. 2 represents another embodiment of the instrument, including indexing indicia labeling the rows.
Figure 3:
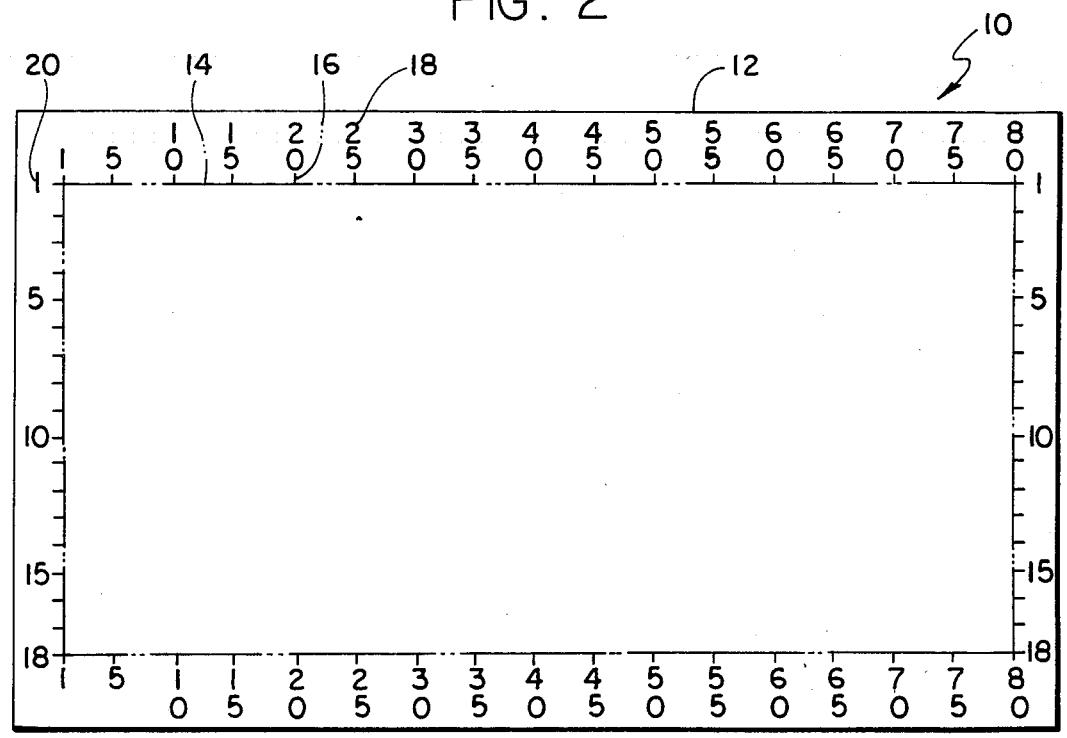
FIG. 3 represents yet another embodiment of the instrument, including indexing indicia labeling every fifth row.

First indicia 14 are applied to the sheet 12. The indicia are chosen to be of a type and style that are each individually discernible to the user against the background of symbols displayed on the VID. The indicia chosen for the embodiments depicted in FIG. 1, FIG. 2, and FIG. 3 is shown to be the dash symbol. The dash symbol takes up little space allowing the underlying VID displayed character to be read by the user. Other symbols such as the period take up less space but are difficult for the user to discern against the background of VID displayed characters. The dash symbol serves the function of delineating a character space and can be applied by the user to the VID at any position along the height of the character space utilized by the VID as well as just above or below the character space. Thus, the first indicia 14 can overlay a character space or delineate the character space, all to the personal preference of the user.

Second indicia 16 are also imprinted on the sheet 12. The second indicia function to visually break up the continuous field of first indicia 14. Most users prefer the first indicia to be broken up into fields easily counted. Because our numbering system is based on ten, the first indicia 14 could be broken up into groups of ten. However, with fields of ten first indicia 14, the user may still find it difficult to easily ascertain the position of the cursor. A further breakdown of the first indicia 14 into smaller groups may be utilized. The preferred embodiments shown in FIG. 1 and 2 have the second indicia 16 demarcating the first indicia 14 into groups of five.

It is normal practice in the computer industry to start counting items with the number zero to take advantage of easy translation from a decimal system to a binary system. However, the numbering of the columns on the VID does not use this practice. Thus, the preferred embodiments shown in FIG. 1, FIG. 2 and FIG. 3 show that when the first labeling indicia 18 are applied to number the columns containing the second indicia 16, the numbering starts with the number one at the left hand edge. The next column of second indicia 16 is labeled with the number five. These initial first labeling indicia 18 are separated by only three first indicia 14. The rest of the labeling of the second indicia 16 into groups of five is accomplished with the spacing of four first indicia 14 between the first labeling indicia 18.

FIG. 2 shows an embodiment for the present invention with a second labeling indicia 20 placed to consecutively number each row of first indicia 14. Another labeling scheme as shown in FIG. 3 demonstrates that the rows of first indicia 14 may be numbered every five rows in a manner similar to the numbering of the second indicia 16.

The above indicia may be imprinted in reverse on the back side of the sheet 12 to present a smooth working surface of the sheet 12 to the user and to protect the indicia from wear. The user can lay the sheet 12 on a flat surface and write directly upon the front surface of the sheet 12 to compose desired format display. An erasable marking instrument such as the grease pencil is particularly adapted for use in laying out the display. The sheet 12 can then be aligned and attached to the front surface of the VID. The user may align the indexing overlay 10 so that the first indicia 14 overlays that portion of the VID in which a character is displayed or may be positioned above or below the character position. This alignment may be easily accomplished by moving the cursor to the lower right hand portion of the display area, aligning the lower right hand portion of the indexing overlay 10 temporarily over the cursor, moving the cursor to home (the upper left hand corner of the display area) and making a final adjustment to the indexing overlay 10 to align the first indicia 14 in the same relative position to the cursor before pressing the indexing overlay 10 in place on the VID. The user can position the cursor of the VID behind the symbols previously written on the sheet 12 by the user. The user can then input the symbols required to make up the display format. After the display format has been completely entered, the user may remove the overlay 10 and erase the markings so that the overlay 10 may be reused.

The above described indicia may be imprinted upon the sheet 12 in black or in a bright color. Indicia printed in the color black are functional, but indicia imprinted in a bright color such as yellow or orange are more discernible by the user against the background of green phosphorescent symbols displayed on the VID or gray reflective-type screens. Yellow or green are more discernible by the user against the background of orange symbols created on the plasma displays. The imprinting of the indicia may be done in a manner to make the indicia a solid symbol.

The solid indicia may be too discriminitive for certain applications. The imprinting of the indicia as transparent, light, uniformly tinted characters may be more desirable when entering display formats utilizing special characters. The tinted indicia may be particularly adaptable for use on those VIDs that are capable of generating graphic characters as well as alphanumeric characters.

The overlay 10 allows the user to easily proof read the display format to verify that all of the correct information has been input in the proper location.

This concludes the description of the preferred embodiment of the present invention. Those skilled in the art may find many variations and adaptations falling within the scope of this invention, and the appended claims are intended to cover all such variations and adaptations falling within the true scope and spirit of the invention.

What is claimed is:

1. A computer video display overlay for detachable electrostatic adhering to the face of a video display for indexing a predetermined number of columns and rows of positions corresponding to a predetermined number of columns and rows, respectively on the display, for allowing visual detection of the display through the overlay and comprising, in combination:
   a body member comprising a flexible, transparent electrostatic charge accepting sheet, said sheet being at least a preselected number of display columns wide and a preselected number of display rows high, and said sheet having a first surface and a second surface and a preselected thickness therebetween for detachable electrostatic attachment to the face of the video display, and said first surface of said sheet contiguous the face of the video display for said electrostatic attachment thereto;
   a plurality of first indicia on said first surface of said sheet and visually detectable through said sheet from regions spaced external from said second surface of said sheet, and said first indicia comprising parallel rows in a first spaced array, each of said rows comprised of a plurality of spaced apart dashes, extending a preselected distance in the width of said sheet, each of said dashes of said first indicia in each row in aligned relationship with the other dashes in said row, and readable against the background of underlying symbols on the computer video display, one of said dashes of said first indicia placed at each of the displayable columnar positions in each of said rows;

a plurality of second indicia on said first surface of said sheet and visually detectable through said sheet from regions spaced external said second surface of said sheet, said second indicia comprising substantially parallel columns in a second spaced array of dashes extending a preselected distance in the height of said sheet, each of said dashes of said second indicia in each column in the spaced array and in alignment with each of the other dashes in said column and readable against the background of underlying symbols on the computer video display, said second indicia extending substantially perpendicularly to said rows of said first indicia, and said second indicia spaced apart and placed substantially coextensive with said first indicia, a first of said second indicia at a preselected columnar position in each of said rows of said first indicia, the combination of said first and second indicia being perceivable by the user as different from said first indicia alone;

said first spaced array and second spaced array defining first, second, third, and fourth margins between said first and second indicia, and each of the four edges of said sheet;

a plurality of first labeling indicia on said first surface of said sheet in a first of said margins and visually detectable through said sheet from regions spaced external said second surface, and readable against the background of underlying symbols on the computer video display, said first labeling indicia comprising numeric indicia of cumulatively numbering said first indicia and placed adjacent each column of said second indicia, whereby the user can detachably attach said sheet by electrostatic attraction to the face of said computer video display to index preselected displayable positions on the computer video display by row and column number; and said second face of said sheet erasably markable upon by preselected instruments.

2. A computer video display overlay as defined in claim 1 wherein said sheet material is acetate whereby the user can erasably write upon said sheet with a preselected instrument.

3. A computer video display overlay as defined in claim 1 wherein said sheet material is hi-static vinyl whereby the user can erasably write upon said sheet with a preselected instrument.

4. A computer video display overlay as defined in claim 1 further comprising:
a plurality of second labeling indicia on said first surface of said sheet in a second of said margins, and visibly detectable through said sheet from regions spaced external said second surface and readable against the background of underlying symbols on said computer video display, said second labeling indicia comprising numeric indicia accumulatively numbering said second indicia and placed adjacent preselected rows of said second indicia.

5. A computer video display overlay as defined in claim 4 wherein said sheet material is acetate whereby the user can erasably write upon said sheet with a preselected instrument.

6. A computer video display overlay as defined in claim 4 wherein said sheet material is hi-static vinyl whereby the user can erasably write upon said sheet with a preselected instrument.

7. The computer video display overlay as defined in claim 1, wherein:
said first labeling indicia are in a third of said margins of said sheet; and
said second labeling indicia are in a fourth of said margins of said sheet; and
said first and third margins of said sheet are adjacent oppositely disposed edges thereof; and
said second and fourth margins of said sheet are in oppositely disposed edges of said sheet different than said first and third margins.

8. A computer video display overlay as defined in claim 1, wherein:
each of said dashes of said second indicia intersect one of said dashes of said first indicia to define a cross symbol.

9. A computer video display overlay as defined in claim 1, wherein:
said first spaced array of said rows of said first indicia is different from said second spaced array of said columns of said second indicia.

10. The arrangement defined in claim 8, wherein:
one of said second labeling indicia is adjacent each of said rows of said first indicia.

* * * * *